(12) United States Patent
Nickel et al.

(10) Patent No.: US 11,036,239 B1
(45) Date of Patent: Jun. 15, 2021

(54) OBJECT IDENTIFICATION FOR AUTONOMOUS ROAD VEHICLES

(71) Applicants: Janice H. Nickel, Pacifica, CA (US); Bryan H. Nickel, San Clemente, CA (US)

(72) Inventors: Janice H. Nickel, Pacifica, CA (US); Bryan H. Nickel, San Clemente, CA (US)

( * ) Notice: Subject to any disclaimer, the term of this patent is extended or adjusted under 35 U.S.C. 154(b) by 0 days.

(21) Appl. No.: 15/479,276

(22) Filed: Apr. 4, 2017

Related U.S. Application Data

(63) Continuation-in-part of application No. 15/260,266, filed on Sep. 8, 2016.

(51) Int. Cl.
*G05D 1/02* (2020.01)
*G08G 1/16* (2006.01)
(Continued)

(52) U.S. Cl.
CPC ............ *G05D 1/028* (2013.01); *B60W 10/18* (2013.01); *B60W 10/20* (2013.01); *B60W 30/09* (2013.01); *B60W 30/12* (2013.01); *B60W 30/143* (2013.01); *B60W 30/18109* (2013.01); *B60W 30/18145* (2013.01); *B60W 30/18163* (2013.01); *G05D 1/0214* (2013.01); *G05D 1/0223* (2013.01); *G06K 9/00791* (2013.01); *G06K 19/0723* (2013.01); *G08G 1/165* (2013.01); *G08G 1/166* (2013.01); *G08G 1/167* (2013.01); *B60W 2050/143* (2013.01); *B60W 2420/52* (2013.01); *B60W 2510/18* (2013.01); *B60W 2510/20* (2013.01); *B60W 2520/10* (2013.01); *B60W 2552/15* (2020.02); *B60W 2552/30* (2020.02); *B60W 2555/60* (2020.02); *B60W 2556/45* (2020.02); *B60W 2710/18* (2013.01);
(Continued)

(58) Field of Classification Search
USPC .......................................................... 701/41
See application file for complete search history.

(56) References Cited

U.S. PATENT DOCUMENTS 5,347,456 A * 9/1994 Zhang ................. G05D 1/0261
180/168
6,758,089 B2 7/2004 Breed et al.
(Continued)

FOREIGN PATENT DOCUMENTS

CN 203759873 U * 8/2014
JP 2008128728 A * 6/2008
(Continued)

OTHER PUBLICATIONS

Google Translation of Japanese Patent Pub. No. JP5087909B2 that was filed and published in 2008 (hereinafter "the '909 publication").*
(Continued)

*Primary Examiner* — Jean Paul Cass
(74) *Attorney, Agent, or Firm* — Hugh P. Gortler

(57) ABSTRACT

An autonomous road vehicle includes means for receiving wireless identification signals during vehicle navigation and using the wireless identification signals to determine position and identification of nearby road objects. The autonomous road vehicle further includes an autonomous vehicle control system responsive to the positions and the identifications.

7 Claims, 11 Drawing Sheets

(51) Int. Cl.
*B60W 30/09* (2012.01)
*B60W 30/18* (2012.01)
*B60W 30/14* (2006.01)
*B60W 30/12* (2020.01)
*B60W 10/18* (2012.01)
*B60W 10/20* (2006.01)
*G06K 9/00* (2006.01)
*G06K 19/07* (2006.01)
*B60W 50/14* (2020.01)
*H01Q 1/32* (2006.01)

(52) U.S. Cl.
CPC ..... *B60W 2710/20* (2013.01); *B60W 2720/10* (2013.01); *B60W 2756/10* (2020.02); *H01Q 1/32* (2013.01)

(56) References Cited

U.S. PATENT DOCUMENTS

| | | | | |
|---|---|---|---|---|
| 8,175,796 | B1* | 5/2012 | Blackburn | G08G 1/161 |
| | | | | 701/301 |
| 8,880,270 | B1* | 11/2014 | Ferguson | B60W 30/00 |
| | | | | 701/23 |
| 9,043,124 | B1* | 5/2015 | Tran | G08G 1/0955 |
| | | | | 701/117 |
| 9,139,199 | B2* | 9/2015 | Harvey | B60W 30/06 |
| 9,251,703 | B1* | 2/2016 | Mbekeani | G08G 1/09675 |
| 9,478,128 | B2* | 10/2016 | Peterson | G08G 1/0112 |
| 9,557,179 | B2* | 1/2017 | Finlow-Bates | G01C 21/26 |
| 2002/0169533 | A1 | 11/2002 | Browne et al. | |
| 2005/0030201 | A1* | 2/2005 | Bridgelall | G06K 7/0008 |
| | | | | 340/870.11 |
| 2006/0177265 | A1* | 8/2006 | Cummings | E01F 9/30 |
| | | | | 404/9 |
| 2008/0228400 | A1* | 9/2008 | Wheeler | E01F 9/578 |
| | | | | 701/301 |
| 2008/0252485 | A1* | 10/2008 | Lagassey | G07C 5/008 |
| | | | | 340/907 |
| 2008/0297401 | A1* | 12/2008 | Nishida | G01S 1/14 |
| | | | | 342/147 |
| 2009/0256723 | A1* | 10/2009 | Peddie | G08G 1/096783 |
| | | | | 340/907 |
| 2010/0052971 | A1* | 3/2010 | Amarillas | G01S 13/862 |
| | | | | 342/22 |
| 2012/0206050 | A1* | 8/2012 | Spero | F21S 41/143 |
| | | | | 315/152 |
| 2015/0019098 | A1 | 1/2015 | Schraebler et al. | |
| 2016/0066137 | A1* | 3/2016 | Kulkarni | G01S 5/0221 |
| | | | | 455/456.1 |
| 2016/0142868 | A1* | 5/2016 | Kulkarni | H04W 4/80 |
| | | | | 455/456.5 |
| 2017/0110022 | A1* | 4/2017 | Gulash | G08B 23/00 |
| 2018/0321356 | A1* | 11/2018 | Kulkarni | G01S 5/04 |
| 2019/0118945 | A1* | 4/2019 | Loveland | G05D 1/0202 |
| 2021/0005085 | A1* | 1/2021 | Cheng | G08G 1/0116 |

FOREIGN PATENT DOCUMENTS

| | | | | |
|---|---|---|---|---|
| WO | WO 2005071597 A1 * | 8/2005 | | G01S 1/68 |
| WO | WO 2013160716 A1 * | 10/2013 | | G01R 31/2875 |

OTHER PUBLICATIONS

Chen et al., "A Passive UHF RFID Tag Antenna for Road Marker Navigation Application," IEEE International Symposium on Antennas and Propagation, pp. 1752-1753 (Jul. 19, 2015).

Enzhan Zhang et al., "Active RFID Positioning of Vehicles in Road Traffic," Communications and Information Technologies (ISCIT), 2011 11th International Symposium on, IEEE (Oct. 12, 2011).

* cited by examiner

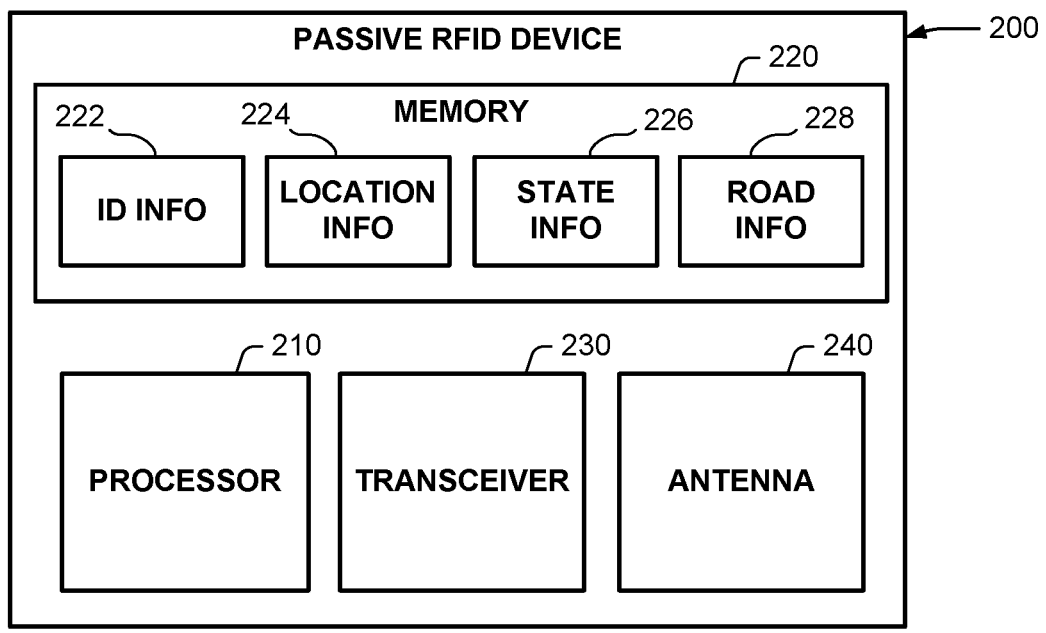
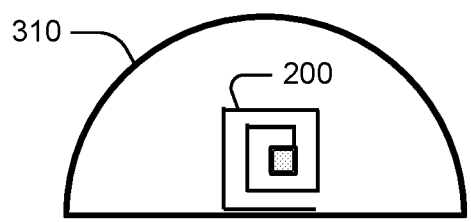

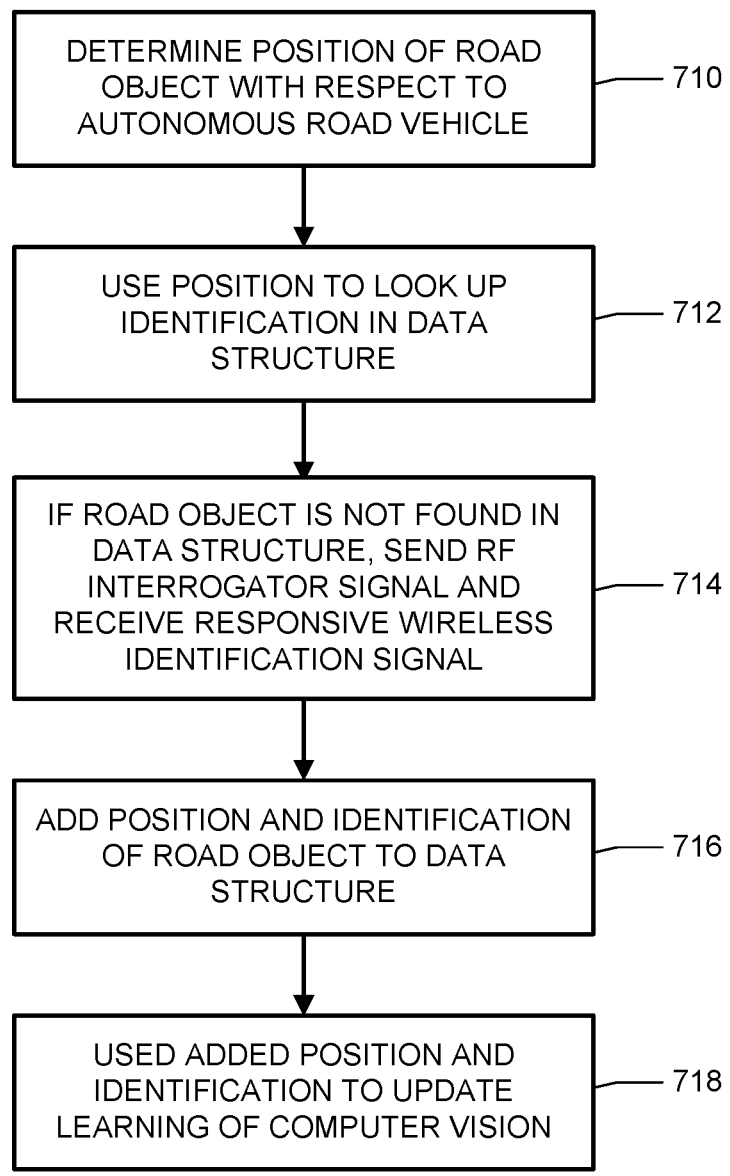

US 11,036,239 B1

OBJECT IDENTIFICATION FOR AUTONOMOUS ROAD VEHICLES

Copending U.S. Ser. No. 15/260,266 filed 8 Sep. 2016 is incorporated herein by reference.

BACKGROUND

A self-driving vehicle is capable of controlling steering, acceleration, and braking without direct driver input. Input may be provided by sensors such as computer vision, radar and lidar.

Computer vision has certain drawbacks. Thick fog, smoky conditions, and snow may make it difficult for the computer vision to identify objects along a road. Moreover, the computer vision "learns" to identify objects, but machine learning may or may not result in accurate object identification.

Sensors such as lidar and radar also have certain drawbacks. Rain, snow and other falling particulate environmental material (e.g., tree leaves and branches) may scatter signals from lidar and radar, resulting in false sensor information to the self-driving vehicle.

Further, incorporating computer vision and full sensor capability in new vehicles can be very expensive. Upgrading older vehicles to self-driving capability (adding computer vision and sensors, and upgrading the older vehicle's processing system to utilize these sensors and provide relevant information) is also very expensive.

BRIEF DESCRIPTION OF THE DRAWINGS

FIG. 2 is an illustration of certain features of a passive RFID device for the transit system.

FIGS. 3A, 3B, 3C and 3D are illustrations of different affixed road objects for the transit system, each of the affixed road objects carrying an RF device.

FIGS. 7A, 7B and 7C are illustrations of three different examples of enhancing computer vision in the autonomous road vehicle of FIG. 6.

DETAILED DESCRIPTION

Figure 1A:
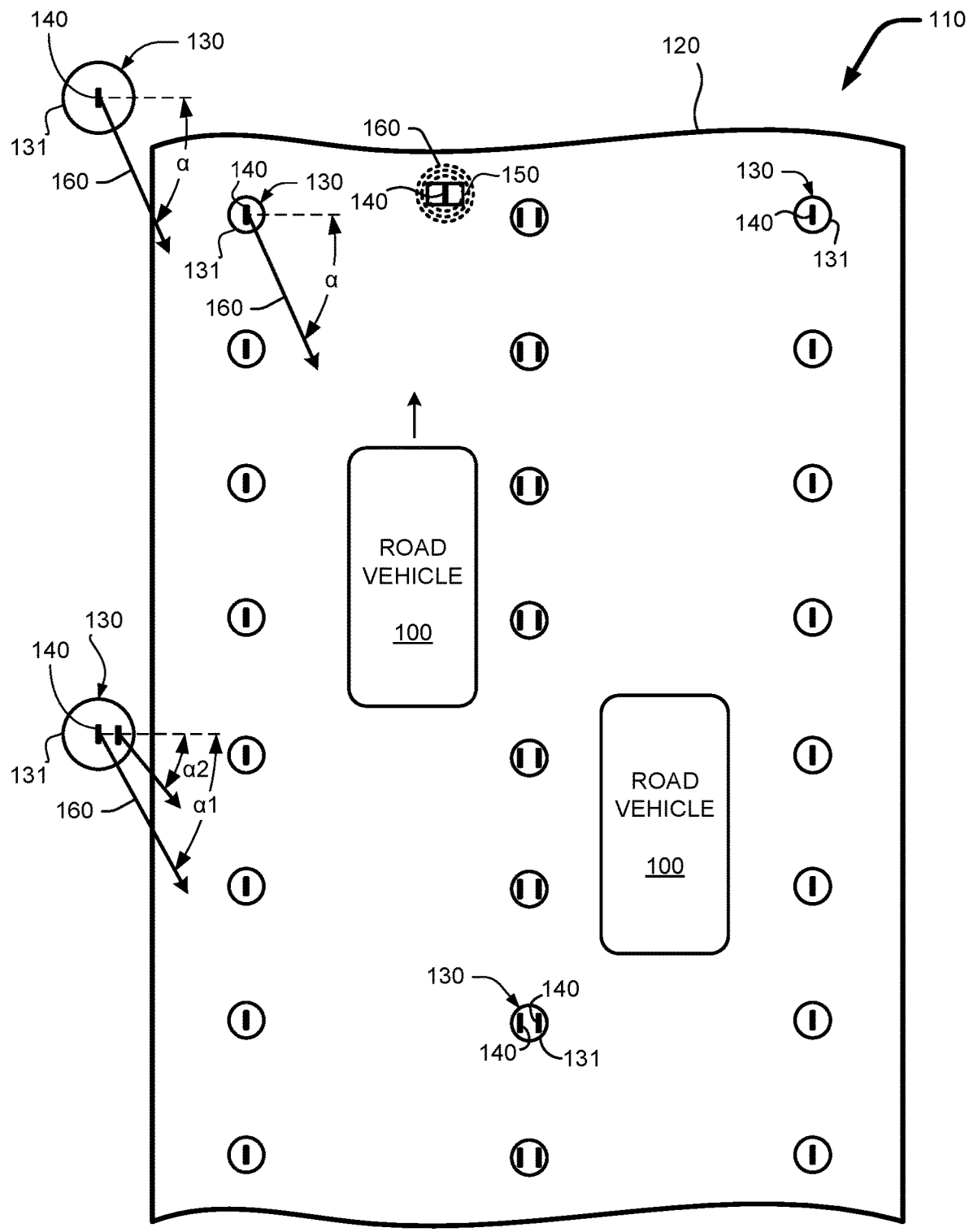
FIG. 1A is an illustration of certain features of a transit system for autonomous road vehicles.

Reference is made to FIG. 1A, which illustrates certain features of a transit system 110 for autonomous road vehicles 100. The transit system 110 includes a road 120. The road 120 is not limited to any particular configuration (e.g., any particular number of lanes, or any particular type). Examples of the road 120 include, without limitation, a paved driveway, a single lane dirt road, and a high capacity road such as a multi-lane Interstate highway. For purposes of illustration, the road 120 of FIG. 1A has two lanes.

The transit system 110 further includes a plurality of road objects 130 that carry RF devices 140. The road objects 130 are located along the road 120. As used herein, "along the road 120" refers to on the road 120 as well as on grounds and objects 130 adjacent the road 120.

The road objects 130 may include "affixed" road objects 131. As used herein, affixed road objects 131 are road objects 130 that are fixed to the road 120, and road objects 130 that are fixed to grounds and objects adjacent the road 120. The affixed road objects 131 may be fixed directly or indirectly. Some of the affixed road objects 131 may be set back from the road 120 further than other affixed road objects 131. Examples of the affixed road objects 131 include, but are not limited to, road markers (e.g., raised pavement markers, guard rails, impact barrels, and runaway truck ramp markers), traffic control devices other than road markers (e.g., medians, curbs, handicap access ramps, traffic lights, speed limit signs, yield signs, street identification signs, freeway entrance signs, and exit signs), bus shelters, crosswalks, gates, and public utility objects (e.g., fire hydrants, power poles, telephone poles, and light posts). Other examples of affixed road objects 131 include trees and park benches. In FIG. 1A, the affixed road objects 131 include raised pavement markers, which define the lanes, and two additional objects 131 on grounds adjacent the road 120.

The road objects 130 may also include movable traffic control devices 132. Examples of the movable traffic control devices 132 include, but are not limited to, street closure barriers and highway cones.

Mobile objects 150 along the road 120 may also carry RF devices 140. The mobile objects 150 include people, pets, and motor vehicles, and small, low mass items such as, strollers, wheelchairs, bicycles, and drones. The people may carry the RF devices, for instance, in wearables (e.g., clothing, jewelry, helmets, and safety vests), electronic devices, and carriable items (e.g., white canes, and bags). Pets may carry the RF devices 140 in collars. RF devices 140 may be carried by mobile objects 150 such as garbage cans and trash bags.

The RF devices 140 generate and broadcast wireless identification signals 160. Encoded in the wireless identification signals 160 is information that identifies their associated objects 130 and 150. For instance, an RF device 140 carried by a fire hydrant generates and broadcasts a wireless identification signal 160 that is encoded with information that identifies the fire hydrant. This encoded identification information may include an ASCII code, an alphanumeric code, a hexadecimal code, or some other code. The encoded identification information may also include identifying features (e.g., height of the fire hydrant, diameter of the fire hydrant, and fitting size of the fire hydrant).

Examples of the RF devices 140 include, but are not limited to, RFID devices, WiFi devices, Bluetooth devices, and ZigBee® devices. The RF devices 140 may be passive, active or any combination thereof.

An active RF device 140 includes its own power source, or it draws power from a power source accessible by its corresponding road object 130 or mobile object 150. For instance, a stop sign may carry a battery, or it may carry solar cells. Active RF devices 140 generate and broadcast the wireless identification signals 160 periodically, and they can also generate and broadcast the wireless identification signals 160 in response to RF interrogator signals.

In contrast, passive RF devices 140 harvest power from RF interrogator signals, and use the harvested power to generate and broadcast the wireless identification signals 160. (As used herein, passive RF devices 140 include semi-passive devices, which also harvest power from RF interrogator signals.) The passive RF devices 140 generate and broadcast the wireless identification signals 160 only when interrogated.

The RF devices 140 may be fabricated as small, inexpensive chips. A chip of an RF device 140 may be enclosed in a housing that is permeable to RF. The housing may be attached to (e.g., bonded to, embedded in, or integrated with) its road object 130 or its mobile object 150.

The RF devices 140 are oriented and configured so that the wireless identification signals 160 are broadcast to oncoming traffic. The wireless identification signals 160 from the road objects 130 may be broadcast at a non-zero transmission angle ($\alpha \gg 0$) with respect to the road 120 (although they may be broadcast at $\alpha=0$). At a transmission angle of $\alpha=0$ degrees, the wireless signal would be transmitted perpendicular to and across the road (in the direction of the dash line). At the non-zero transmission angle ($\alpha \gg 0$), a wireless identification signal 160 is transmitted in a direction towards oncoming traffic. The wireless identification signal 160 expands and subtends some angle around the transmission angle $\alpha$ (as it is an RF signal as opposed to a laser signal). An oncoming vehicle 100 receives the wireless identification signal 160 before reaching the RF device 140 that sends the wireless identification signal 160.

A road object 130 may carry more than one RF device 140. A road object 130 carrying multiple RF devices 140 may broadcast wireless identification signals 160 at different transmission angles. As shown in FIG. 1A, an affixed road object 131 broadcasts a first wireless identification signal 160 at a first transmission angle ($\alpha 1$) towards oncoming traffic, and it broadcasts a second wireless identification signal 160 at a second transmission angle ($\alpha 2$), also towards oncoming traffic. In other configurations, the second wireless identification signal 160 may be directed towards an opposite direction ($\alpha 2 > 180$ degrees), or a perpendicular direction ($\alpha 2 = 0$ degrees), or some other angle ($0 < a2 < 180$).

Whereas the orientation of a road object 130 with respect to the road 120 is known and does not change, the orientation of a mobile object 150 may be subject to constant change. In some configurations, a single RF device 140 may broadcast its wireless identification signal 160 omidirectionally (as represented by the dash concentric circles). In other configurations, multiple RF devices 140 may broadcast the wireless identification signals 160 from the mobile object 150 in different directions (e.g., forward and back, side-to-side).

Broadcast range of the wireless identification signals 160 is typically a function of factors such as transmit power, receive sensitivity and efficiency, antenna design, frequency, device orientation, and surroundings. Active RF devices 140 may have a greater transmit range than passive RF devices 140. The range, strength and frequency of the RF interrogator signals may also depend in part upon speed of oncoming traffic. The broadcast range may be in the 1-100 meter range.

The information encoded in the wireless identification signals 160 is not limited to identification information. Absolute location of the road objects 130 may also be encoded in the wireless identification signals 160. For instance, an RF device 140 carried by a light post may be configured with a GPS location of the light post. The GPS location may be obtained from a satellite signal via a GPS receiver and stored in memory of the RF device 140. However, GPS satellite signals are known to have has accuracy problems in locations with large reflective surfaces, such as downtown cities, and canyons. In the alternative, a precise location of the light post may be determined by other means (e.g., via land surveying), and that precise location is printed onto the RF device 140.

If an object 130 or 150 has different states, its state information may be encoded into its wireless identification signal 160. For instance, a traffic light may change states between red, green and amber. The RF device 140 carried by a traffic light may be programmed to encode the state of the traffic light in the wireless identification signal 160. The wireless identification signal 160 may also be encoded with information indicating when the traffic signal is about to change states (e.g., from amber to red).

Additional information may be encoded in the wireless identification signals 160. For instance, the RF devices 140 carried by road objects 130 such as raised pavement markers and traffic control devices may encode road information in their wireless identification signals. The road information may include upcoming traffic information such as distances to stop signs, traffic lights, and intersections. The road information may include road topography, such as distance to changes in road curvatures and grades (e.g., the number of feet to the start of a turn with a curvature of a given radius; and the number of feet to the start of downgrade of a certain percentage). Other pertinent information may also be included, such as the speed limit posted by a speed limit sign, the street name and block number indicated in a street identification sign, exit number and street for a freeway exit sign, etc.

Figure 1B:
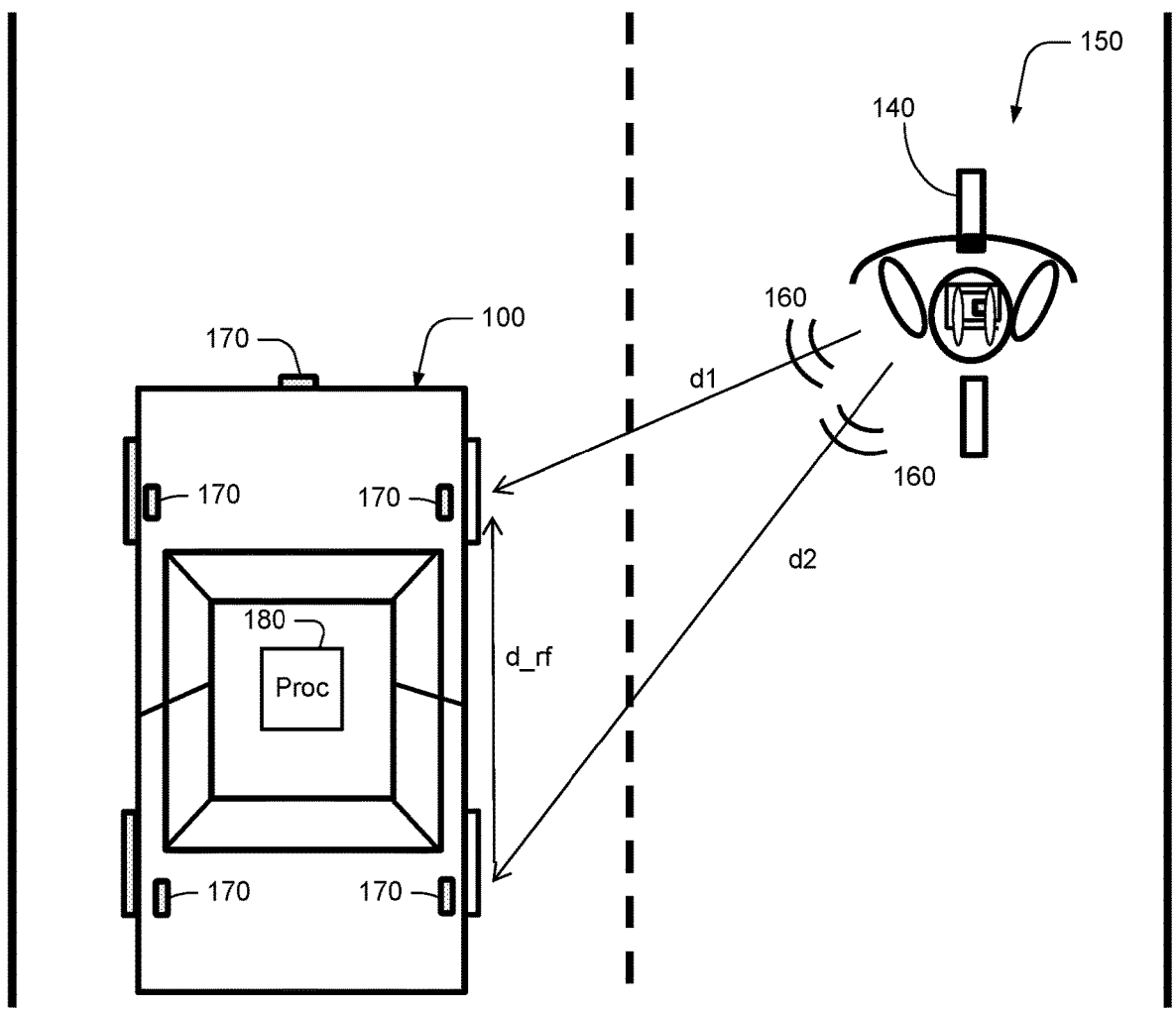
FIG. 1B is an illustration of an autonomous road vehicle determining distance to a road object.

Additional reference is made to FIG. 1B. An autonomous road vehicle 100 having multiple RF readers 170 can determine the position of a mobile object 150 (e.g., a helmet worn by a motorcyclist or bicyclist) relative to the autonomous road vehicle 100. For example, the autonomous road vehicle 100 is equipped with four RF readers 170 at disparate positions. Each reader 170 generates an RF interrogation signal, which causes the RF device 140 of the mobile object 150 to broadcast a wireless identification signal 160 towards the autonomous road vehicle 100. All of the RF readers 170 receive the wireless identification signal 160. Analysis of the wireless identification signal 160 may be performed with the two readers 170 on the near side of the autonomous road vehicle 100. Since those two readers 170 are at different locations, there will be a time difference between receipt of the wireless identification signal 160; and similarly there will be a difference in the signal strength. Either difference may be used to determine relative distances d1 and d2 to the mobile object 150. A processor 180 aboard the autonomous road vehicle 100 may determine the relative distances d1 and d2 from strength of signal ("SoS") or time of flight ("ToF") of the wireless identification signal 160 (a processor having a clock speed of 1.8 GHz, for instance, is capable of measuring the distance of an object 130 that is one meter away from the vehicle 100). Knowing these distances d1 and d2, and also knowing distance d_rf between the two near-side readers 170, the autonomous road vehicle 100 may then triangulate the relative position of the mobile object 150. The relative position of a road object 130 may be determined in a similar manner.

The road objects 130, the mobile objects 150 and the RF devices 140 establish an information network for autonomous road vehicles 100. An autonomous road vehicle 100 traveling down the road 120 uses the wireless identification signals 160 (that is, determining relative location and/or processing the encoded information) to enhance situational awareness with respect to the autonomous road vehicle 100.

Different classifications of autonomous road vehicles 100 may use the wireless identification signals 160 in different ways. In the United States, the National Highway Traffic Safety Administration (NHTSA) has proposed a formal classification system that involves five levels.

An autonomous road vehicle 100 having a level 0 classification has no automation, but it may issue warnings. For instance, a processing system of such an autonomous road vehicle 100 may use the wireless identification signals 160 to identify objects 130 and 150 on the road 120 and sound an audible alarm when an object 130 or 150 is within an unsafe distance. The relative distances and the encoded information may be used by a navigation system aboard the autonomous road vehicle 100 (e.g., a built-in navigation system, or a mobile application such as Google Maps Navigation).

An autonomous road vehicle 100 having a level 1 classification has function-specific automation. That is, one or more specific control functions are automated. Examples include electronic stability control or pre-charged brakes, where the autonomous road vehicle 100 automatically assists with braking to enable the driver to regain control of the motor vehicle 100, or stop faster than possible by acting alone, or perform collision avoidance. An autonomous road vehicle 100 having a level 1 classification may also utilize the wireless identification signals 160 in the same manner as an autonomous road vehicle 100 having a level 0 classification.

An autonomous road vehicle 100 having a level 2 classification has combined function automation. At least two primary control functions are designed to work in unison to relieve the driver of control of those functions. An autonomous road vehicle 100 having a level 3 classification has limited self-driving automation, wherein a driver can fully cede control of all safety-critical functions in certain conditions. An autonomous road vehicle 100 having a level 3 classification can sense when conditions require the driver to retake control and can provide a "sufficiently comfortable transition time" for the driver to do so. An autonomous road vehicle 100 having a level 2 classification or a level 3 classification may utilize the relative distances and/or encoded information to perform braking and steering to avoid objects 130 and 150 along the road 120.

An autonomous road vehicle 100 having a level 3 classification may use the relative positions and the encoded information to set longer warning times when encountering road situations where control needs to be ceded to the driver. For instance, if the encoded information indicates upcoming road work and lane closures, or sharp turns in the road ahead, the autonomous road vehicle 100 can warn the driver that it will cede control in a comfortable time period, rather than ceding in an urgent manner when it encounters road conditions that it is unable to navigate safely. If the encoded information indicates an upcoming state change for a traffic light (e.g., a green light is ready to change), the autonomous road vehicle 100 might begin braking to anticipate the state change (e.g., make the light or stop) depending on the speed of the autonomous road vehicle 100 and the relative distance to the traffic light.

An autonomous road vehicle 100 having a level 4 classification has full self-driving automation. Destination or navigation input is provided at the beginning of a trip, but a driver is not expected to be available for control at any time during the trip. Such an autonomous road vehicle 100 may be driverless, and it may be occupied or unoccupied. A motor vehicle having a level 4 classification may utilize the relative positions and encoded information in the same manner as a vehicle having a level 3 classification, except that control is not ceded at any time to a driver. Thus, an autonomous road vehicle 100 having a level 4 classification can use the relative distances and the encoded information not only to avoid obstacles, but also to plot and execute a driving path. For instance, the autonomous road vehicle 100 can use encoded information about road topography, such as distance to changes in road curvatures and grades (e.g., the number of feet to the start of a turn with a curvature of a given radius; and the number of feet to the start of downgrade of a certain percentage) to reduce speed for an upcoming sharp turn and additionally down shift to navigate the downgrade safely. It can use the encoded information to plan for exits, lane changes, and other driving maneuvers.

An autonomous road vehicle 100 having a level 4 classification may use the encoded information to minimize and prioritize actions in a critical situation. Consider the example of an autonomous road vehicle 100 in a situation where a crash cannot be avoided. The autonomous road vehicle 100 may use the encoded information to make the decision of which object in the vicinity to hit. It can choose the priority of safety of the various objects in the vicinity (e.g., avoiding humans first, pets second, inanimate objects third, and so on). In addition, it can choose the priority of inanimate objects to hit (e.g., avoiding or prioritizing a public utility object over a tree). This and similar situations may occur too quickly for computer vision alone to accurately access the objects 130 and 150 and make the best decision. Moreover, since computer vision relies on machine learning, it may not accurately identify all the objects in the vicinity, which creates a safety hazard to vulnerable objects.

To further increase situational awareness, the wireless identification signals 160 may be used to create accurate mapping information about the road objects 130 and the mobile objects 150 and any other objects nearby. This mapping information may be uploaded to a shared database, which aggregates the mapping information from many other autonomous vehicles 100, giving redundant verification of object location, as well as timely awareness of changes to object locations. The aggregated mapping information may be used by standard navigation and mapping services such as Apple Maps and Google Maps.

The aggregated mapping information may also be transmitted back to an autonomous road vehicle 100 to further enhance situational awareness. The aggregated mapping information may be used to identify objects 130 and 150 that the autonomous road vehicle 100 has yet to encounter en route to a destination. An autonomous road vehicle 100 having a level 4 classification may, for instance, may consider these objects 130 and 150 while plotting and executing a driving path.

The transit system 110 enables autonomous road vehicles 100 to perform real-time object identification. The transit system 110 utilizes existing road objects 130, with only minor additions to those road objects 130.

The information network established by the transit system 110 does not require communication via the Internet. Therefore, it is not subject to power outages and Internet attacks (e.g., denial of service attacks), which can create security and safety issues for self-driving vehicles. Moreover, the information network does not rely on GPS satellite signals, which can be inaccurate in certain environments.

Raised pavement markers and other road markers of the transit system 110 may carry RF devices 140 that are oriented to transmit RF navigation signals at a transmission angle of about α=0 degrees as described in copending U.S. Ser. No. 15/260,266. The autonomous road vehicles 100 may use the RF navigation signals to determine lateral lane position.

The transit system 110 also enables older non-autonomous vehicles to be inexpensively upgraded to function autonomously. An older vehicle may be inexpensively upgraded to a level 0 classification simply by adding an RF transponder, reader, processor and alarm.

Reference is made to FIG. 2, which illustrates functional components of a passive RFID device 200 for the transit system 110. The passive RFID device 200 includes a processor 210, machine-readable memory 220, a transceiver 230, and an antenna 240. Information stored in the memory 220 may include, but is not limited to, identification information 222, location information 224, state information 226, and road information 228. The transceiver 230 receives an RF interrogator signal, which powers the processor 210 to generate encoded information and send the encoded information to the transceiver 230. The transceiver 230 then broadcasts the encoded information wirelessly via the antenna 240.

The RFID device 200 may be configured to receive messages or data from RFID printers, and store information contained in those messages or data. For instance, if any exit is closed due to maintenance, this exit closure information may be wirelessly downloaded or printed to the RFID devices 220 of those objects 130 and 150 preceding the closed exit.

In North America, the RFID devices 200 may broadcast the wireless identification signals 160 at 433 MHz, which can be adjusted to cover about 1 to 100 meters. In Europe, the RFID devices 200 may broadcast the wireless identification signals 160 at 433 MHz.

However, the RFID devices 200 are not limited to these standard frequencies. They may communicate over non-standard radio frequencies (e.g., special frequencies slotted for autonomous navigation), and they may have different nomenclature. Other aspects of the standard RFID device may be altered including, but not limited to, range, memory size, and memory configurations.

FIGS. 3A, 3B, 3C and 3D illustrate examples of different affixed road objects 131 that carry RFID devices 200. FIG. 3E illustrates an example of a movable traffic control device 132 that carries an RFID device 200.

Reference is made to FIG. 3A, which illustrates a raised pavement marker known as a Botts' dot 310. A typical Botts' dot 310 is semi-hemispherical. A flat surface of the Botts' dot 310 is secured to the road 120. At least one RFID device 200 is embedded within the Botts' dot 310. For illustrative purposes, FIG. 3 shows the Botts' dot 310 as being made of translucent material, whereby the RFID device 200 is visible. In practice, however, the Botts' dot 310 is typically made of ceramic or plastic. RF signals penetrate both ceramic and plastic in the length scales of a Botts' dot 310.

Orientation of the RFID device 200 within the Botts' dot 310 may be characterized by a mounting angle. The RFID device 200 may be oriented parallel to (facing) the flat surface of the Botts' dot 310 (mounting angle=0 degrees), it may be oriented perpendicular (edge-wise) to the flat surface (mounting angle=90 degrees), or it may be oriented at some mounting angle between 0 and 90 degrees. The example of FIG. 3A shows the RFID device 200 at a mounting angle of 90 degrees.

Figure 3B:
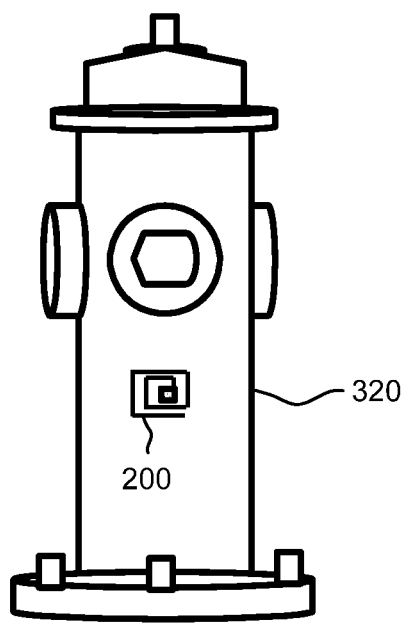

Reference is made to FIG. 3B, which illustrates a fire hydrant 320. The RFID device 200 may be mounted on any surface of the fire hydrant 320. Preferably, the RFID device is mounted on a vertical surface, at or above ground level. Since the metal of the fire hydrant 320 will shield the (incoming) RF interrogator signal and the (outgoing) wireless identification signal 160 along directions opposite to the face of the RFID device 200, more than one RFID device 200 may be mounted on the fire hydrant 320, facing different directions. For example, a first RFID device 200 may face substantially toward oncoming traffic, and a second RFID device 200 may face substantially traffic from the opposite direction. Each RFID device 200 may be mounted in a housing that is permeable to RF signals in one direction. A mylar or other signal-shielding material may be on the side of the housing that is mounted to the fire hydrant 320.

The RFID device 200 is not limited to the orientation illustrated in FIG. 3B. For example, RFID devices 200 could be mounted on the bolts securing the fittings of the fire hydrant 320, or it could mounted on a horizontal surface. However, the preferred mounting orientation is perpendicular to the ground (that is, a mounting angle of 90 degrees).

Figure 3C:
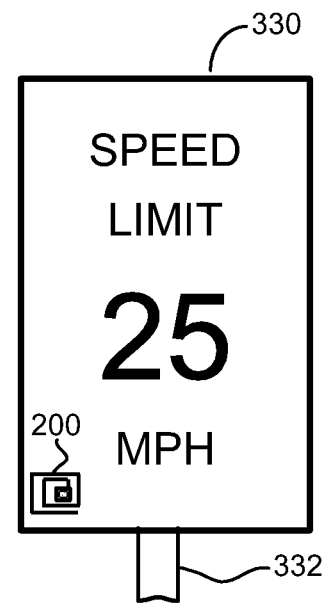

Reference is made to FIG. 3C, which illustrates a traffic control sign 330. The RFID device 200 may be mounted on the front surface of the traffic control sign 330 so it is facing substantially toward oncoming traffic. Preferably, the RFID device 200 is located at the lower left corner of the traffic control sign 330 (as viewed from oncoming traffic) to maximize signal strength of the interrogator signal coming from the autonomous road vehicle 100. This preferred location also maximizes the wireless identification signal 160 observed by autonomous vehicles 100. However, the RFID device 200 is not limited to the location illustrated in FIG. 3C, and may be at another location on the traffic-facing side of the traffic control sign 330. In another configuration, the RFID device 200 may be mounted to a pole 332 supporting traffic control sign 330. Additional RFID devices 200 may be placed on the traffic control sign 330 so as to face oncoming traffic.

An additional RFID device 200 may be located on the sign 330 or the pole 332 so as to face opposing traffic. If an autonomous road vehicle 100 loses control from the opposing traffic side (e.g., jumps a lane and strays into oncoming traffic), it will identify the pole 332 supporting the traffic control sign 330 and try to avoid the pole 332.

Figure 3D:
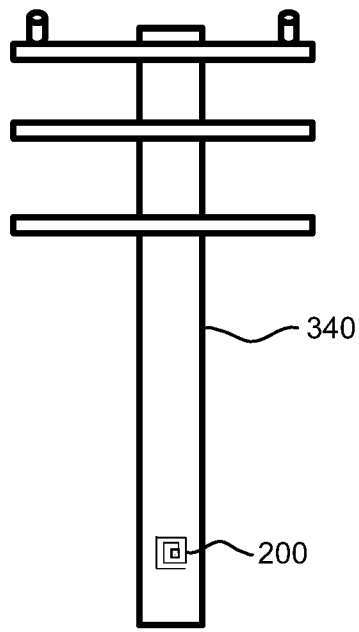
Figure 3E:
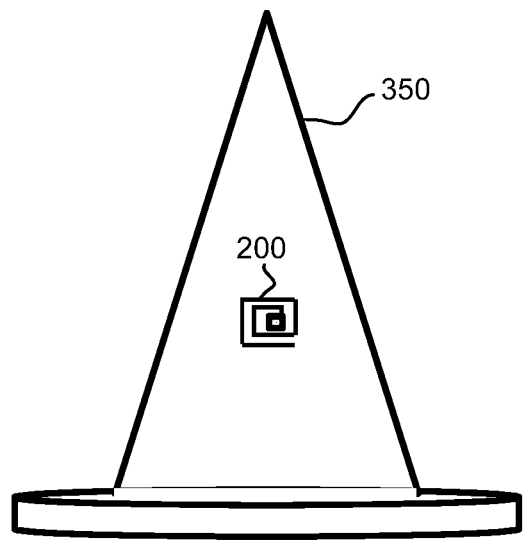
FIG. 3E is an illustration of a movable traffic control device for the transit system, the movable traffic control device carrying an RF device.

Reference is made to FIG. 3D, which illustrates a utility pole 340. The utility pole 340 may carry electrical wires, high voltage wires, telephone wires, cable wires, or other type of wires. The RFID device 200 is not limited to a particular location on the utility pole 340, but is preferably in a direction that faces oncoming traffic. Another RFID device 200 may be mounted on the utility pole 340 so as to face opposing traffic. Information transmitted by the RFID device 200 on the utility pole 340 may include, but is not limited to, the types of utility wires carried by the pole 340, voltage of the electrical wires, and route information on where the wires originate and terminate.

Reference is made to FIG. 3E, which illustrates a road cone 350. A mounting angle substantially equal to ninety degrees is desired in order to optimize the RF interrogator signal from the autonomous road vehicle 100, and also to optimize the wireless identification signal 160 transmitted to the autonomous road vehicle 100. Information transmitted by the RFID device 200 may include, but is not limited to, the location of the road cone 350, the nature of the hazard ahead (that is, the reason why the road cone 350 is being used), the distance to the hazard ahead, how many lanes are closed, etc.

In the examples of FIGS. 3D and 3E, the height of the RFID devices 200 is preferably at a similar height of the RF readers 170 of the autonomous road vehicle 100. This results in a direct signal path from the reader 170 to the RF device 140.

The road objects 130 and mobile objects 150 may carry RF devices 140 that are redundant. Redundant RF devices 140 on an object 130 or 150 may broadcast the same information. Redundant RF device 140 may be located in substantially the same position on an object 130 or 150, or they may be located in different positions. For example, different redundant RF devices 140 may be located at different heights on a utility pole 340 to optimize signals from autonomous road vehicles 100 with readers 170 at different heights. Moreover, redundant RF devices 140 are especially desirable on road cones 350 and other objects that may suffer from collision damage, stacking damage, or other damage.

Figure 4:
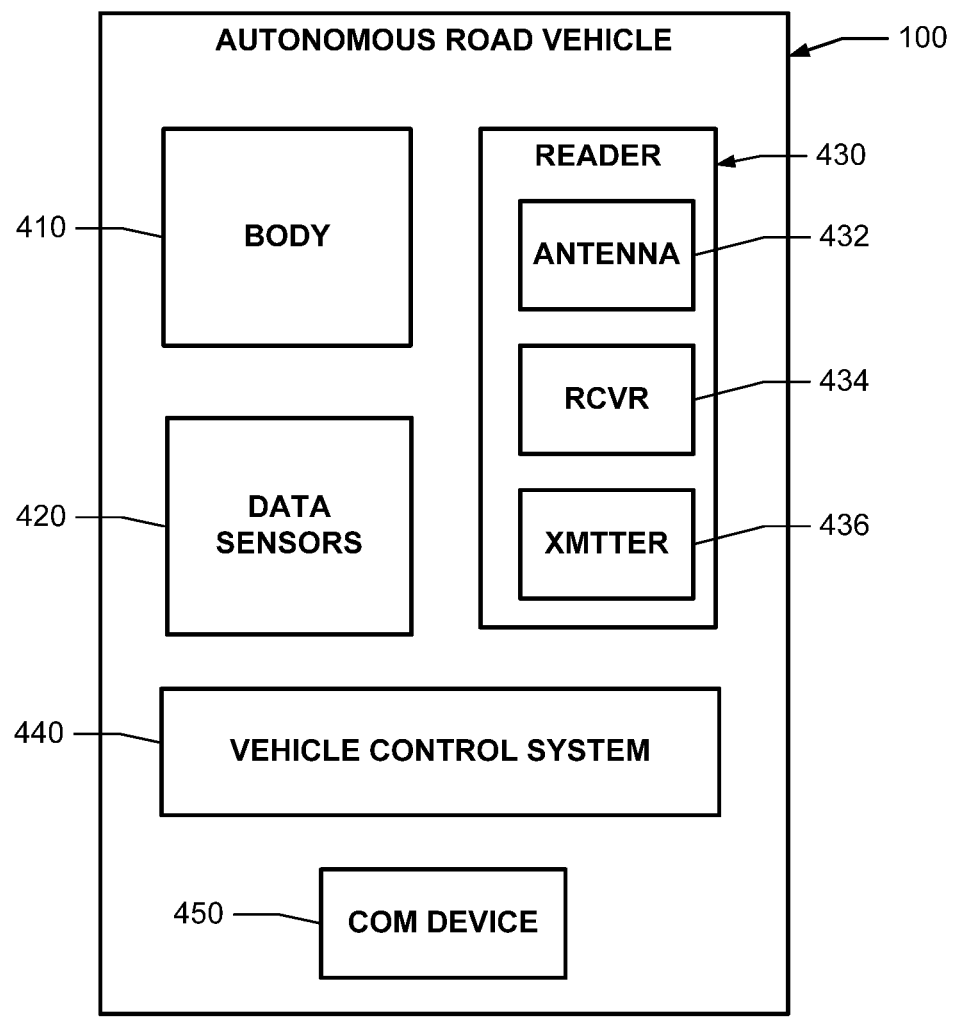
FIG. 4 is an illustration of certain features of an autonomous road vehicle configured for the transit system.

Reference is now made to FIG. 4, which illustrates certain features of an autonomous road vehicle 100 having an NHTSA classification level of at least 3. The autonomous road vehicle 100 is not limited to any particular type. Different types include, but are not limited to, an automobile, motorcycle, utility vehicle, truck, and transport vehicle (e.g., a bus, a, passenger van).

The autonomous road vehicle 100 includes a body 410, data sensors 420, at least one RF reader 430 (FIG. 4 shows only a single RF reader 430), and an autonomous vehicle control system 440. (Other elements of the autonomous road vehicle 100, including the engine and drive train, are not illustrated.) In the case of a motorcycle, the body 410 includes a frame. In the case of an automobile, the body 410 includes a chassis and an outer shell attached to a chassis.

The data sensors 420 generate sensory data for the vehicle control system 440. Examples of the data sensors 420 include, but are not limited to, radar, lidar, GPS, and odometry.

The RF reader 430 of FIG. 4 is mounted to the body 410 at a location that enables its antenna 432 to capture the wireless identification signals 160 during movement of the autonomous road vehicle 100. The RF reader 430 further includes an RF receiver 434 for using the captured wireless identification signals 160 to determine relative locations and extract encoded information. If the RF devices 140 are active, the RF reader 430 may be passive or active. If the RF devices 140 are passive, then the RF reader 430 may be active. The autonomous road vehicle 100 may supply power to an RF reader 430 that is active. An RF reader 430 that is active may also have a transmitter 436 for transmitting interrogator signals via the antenna 432 during movement of the autonomous road vehicle 100.

The RF reader 430 of FIG. 4 is illustrated in terms of functionality. The RF receiver 434 and the transmitter 436 may be integrated into a single transceiver, or they may be implemented as separate components. The RF receiver 434 and the transmitter 436 may have separate processing capability, or they may share a common processor. The RF reader 430 may contain more than one receiver and one transmitter, which may operate at the same or different frequencies.

The autonomous vehicle control system 440 may include a processing system programmed to use the relative locations and the encoded information and any sensor data to spatially locate the identified objects with respect to the autonomous road vehicle 100. For instance, the processing system may be programmed to create a data structure identifying the local objects and their distances from the autonomous road vehicle 100. Examples of the data structure include, but are not limited to, a list, map, an index, and a situational awareness display.

The autonomous road vehicle 100 of FIG. 4 may also include a communications device 450 (e.g., WiFi, 3G/4G) for communicating with a navigation and mapping service. The autonomous road vehicle 100 may upload its mapping information to the service, which then aggregates the mapping information from other autonomous road vehicles 100 and other sources. The service then downloads pertinent mapping data to all of the autonomous road vehicles 100.

Figure 5:
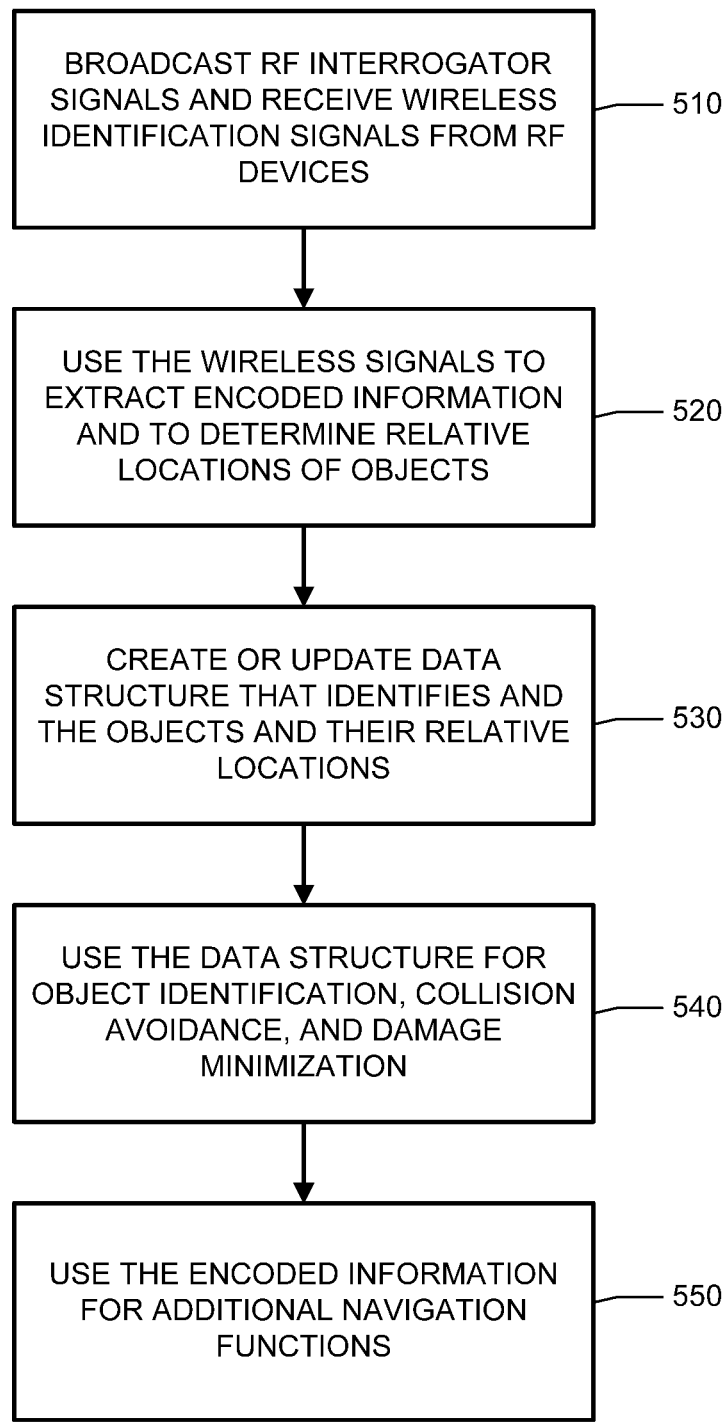
FIG. 5 is an illustration of a collision avoidance method for the autonomous road vehicle of FIG. 4.

Additional reference is made to FIG. 5, which illustrates an example of a collision avoidance method for the autonomous road vehicle 100 of FIG. 5. At block 510, as the autonomous road vehicle 100 moves along the road 120 in a forward direction, and the RF reader 430 broadcasts RF interrogator signals and receives wireless identification signals 160 transmitted by nearby passive and active RF devices 140. Each of the RF interrogator signals may be broadcast continuously or in timed radio pulses.

At block 520, the RF reader 430 extracts identification, location, state, and additional information that is encoded in the wireless identification signals 160. The RF reader 430 may also receive location data from the data sensors 420, and (in conjunction with other RF readers 430) it also may analyze SoS or ToF, and perform triangulation of the wireless identification signals 160 to determine relative positions of the objects 130 and 150.

At block 530, the RF reader 430 or the vehicle control system 440 (or other processing system) uses the encoded information and the relative locations of the objects 130 and 150 to create or update a data structure. An existing data structure may be updated to reflect changes in relative positions, to remove road objects 130 that the vehicle 100 has passed, and to add new road objects 130 that the vehicle 100 encounters. A new or updated data structure may be uploaded to a navigation and mapping service via the communications device 450.

At block 540, the vehicle control system 440 uses the data structure for collision avoidance. If a collision cannot be avoided, the autonomous vehicle control system 440 may apply the data structure to a decision tree to minimize destruction and loss of life (e.g., avoiding humans first, pets second, etc.).

At block 550, the vehicle control system 440 may use the encoded information to perform additional navigation functions. These additional navigation functions include, but are not limited to, distinguishing between different vehicles on the road 120, identifying signs, and planning appropriate navigation paths. These additional navigation functions may also include real-time responses to changes in traffic conditions (e.g., identification of next exit, and distance to next exit, safe execution of lane changes to a desired exit, and avoidance of lane and bridge closures).

The processing of the wireless identification signals 160 may also include taking measures to prevent false information or interference from other vehicles on the road 120. For instance, the autonomous road vehicle 100 has an identifier and/or identifying handshaking signal (e.g., a series of short or long pulses), which are reflected by certain road objects 130. Thus, the RF reader 430 only listens to the navigation signal returned in response to the handshaking signal.

The autonomous road vehicle 100 can navigate the transit system 110 without the use of computer vision. Thus, the autonomous road vehicle 100 may avoid the high cost of computer vision systems.

Figure 6:
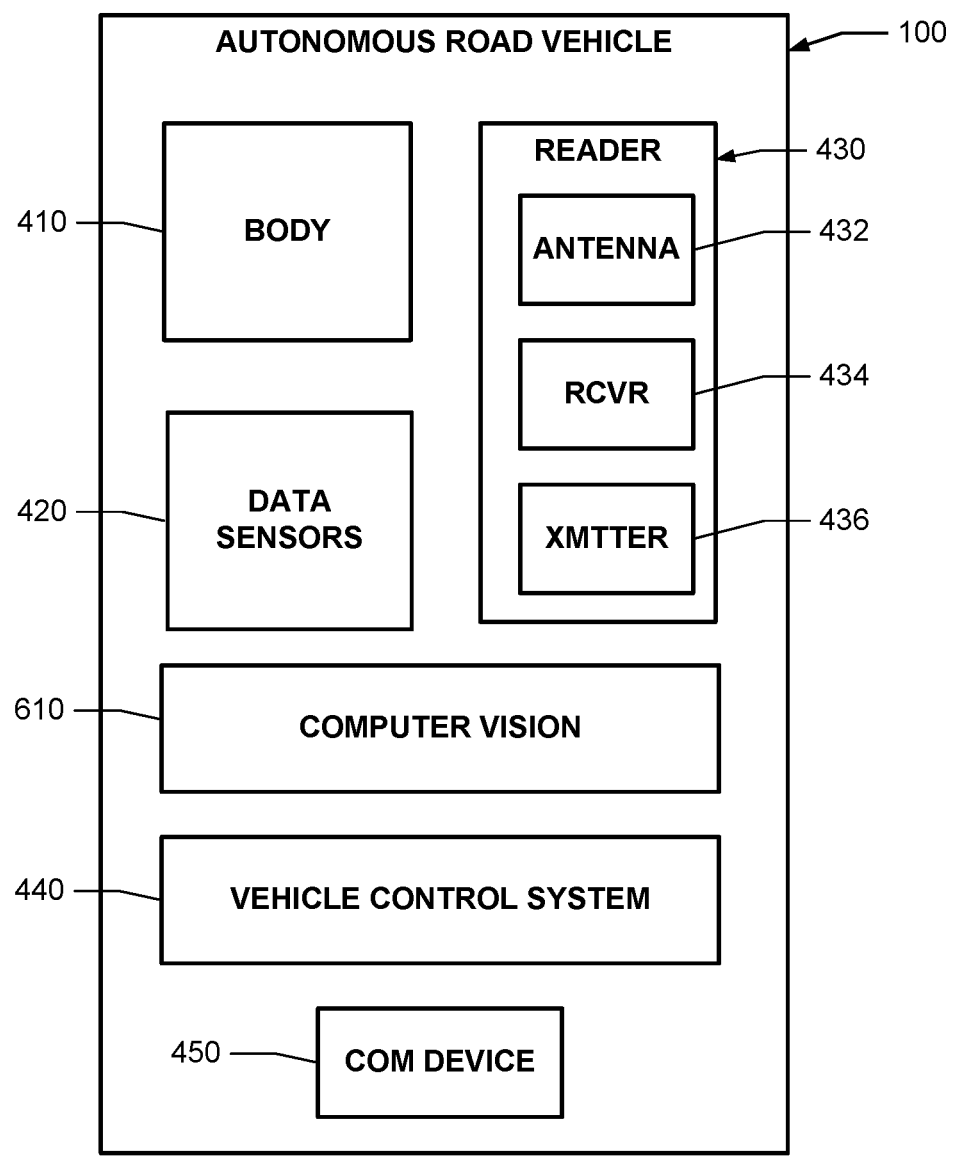
FIG. 6 is an illustration of certain features of another autonomous road vehicle configured for the transit system.

In some configurations however, such as the one illustrated in FIG. 6, the autonomous road vehicle 100 may include computer vision 610. The computer vision 610 compares the data it is acquiring to the previously recorded data to differentiate objects in its view. The computer vision 610 may use Machine Learning (ML), a type of Artificial Intelligence (AI) that gives computers the ability to learn without being explicitly programmed to recognize and identify objects.

During training, the computer vision 610 is exposed to many different training images. Salient features of objects in these images are automatically detected and processed by a deep learning algorithm. A mapping between features and vehicle actions may be established during training.

However, there will be instances in which the computer vision 610 cannot identify an object 130 or 150. The computer vision 610 is trained under certain conditions, and there is uncertainty as to exactly what has been learned from the training. For example, if the computer vision 610 has been trained to recognize traffic objects in sunny conditions, it may not recognize them under different conditions. Further, different vehicles 100 will be trained under different conditions, and subsequent learning will be unique among each vehicle 100. Still further, the computer vision 610 may encounter new objects that were not present in the training images.

The data structure generated by the RF reader 430 may be used to enhance the computer vision 610. Three different examples are illustrated in FIGS. 7A, 7B and 7C.

In the example of FIG. 7A, the data structure is used to identify objects that the computer vision 610 does not recognize. The computer vision 610 (or other means) determines positions of such objects with respect to the autonomous road vehicle 100 (block 710), and uses positions to look up the corresponding identifications in the data structure (block 712).

If a null response is received, that is, an object is not found in the data structure, the identity of that object is determined. For instance, the reader 430 sends an interrogator signal and receives a responsive wireless identification signal 160 from that object (block 714). Position and identification information are determined from the wireless identification signal 160, and added to the data structure and utilized by vehicle control system 440 (block 716) In addition, the computer vision 610 uses the added information to update its learning to identify the object (block 718).

Figure 7B:
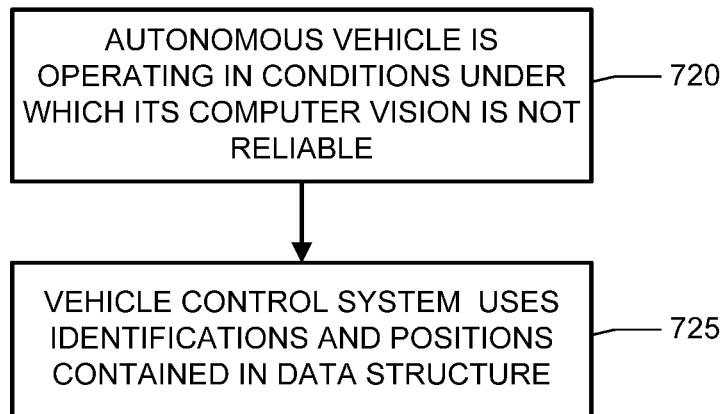
Figure 7C:
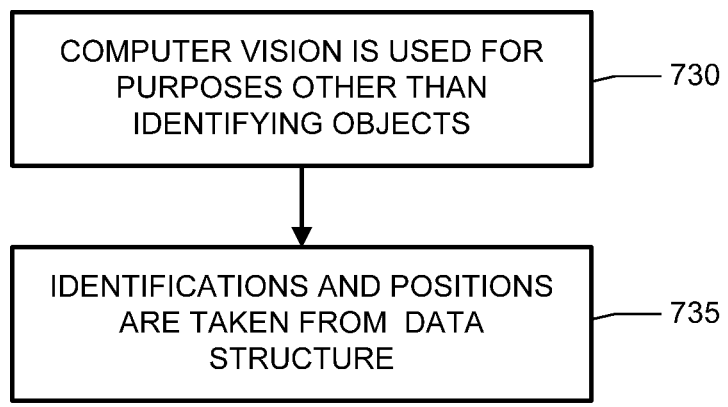

In the example of FIG. 7B, the autonomous road vehicle 100 is operating in conditions under which the computer vision 610 is not reliable (block 720), and the vehicle control 440 uses the identified objects and their locations contained in the data structure instead of using the response of the computer vision 610 (block 725). For instance, the identified objects and their locations contained in the data structure may be used when the driving conditions are subject to thick fog, smoky conditions, or snow.

In the example of FIG. 7C, the computer vision 610 is used for purposes other than identifying objects 130 and 150 (block 730). The vehicle control system 440 uses the identifications and the positions contained in the data structure (block 735).

For an autonomous road vehicle 100 having a single RFID reader 430, that single reader 430 may be placed at front center of the autonomous road vehicle 100. However, the use of multiple RF readers 430 offers advantages over a single RF reader 430. Multiple RF readers 430 can deliver more power to passive RF devices. Interrogation by multiple RFID readers 430 also allows greater control of the angle of the RF interrogator signals relative to the road objects. Multiple RF readers 430 can be used to determine the relative locations of any objects 130 and 150.

Figure 8:
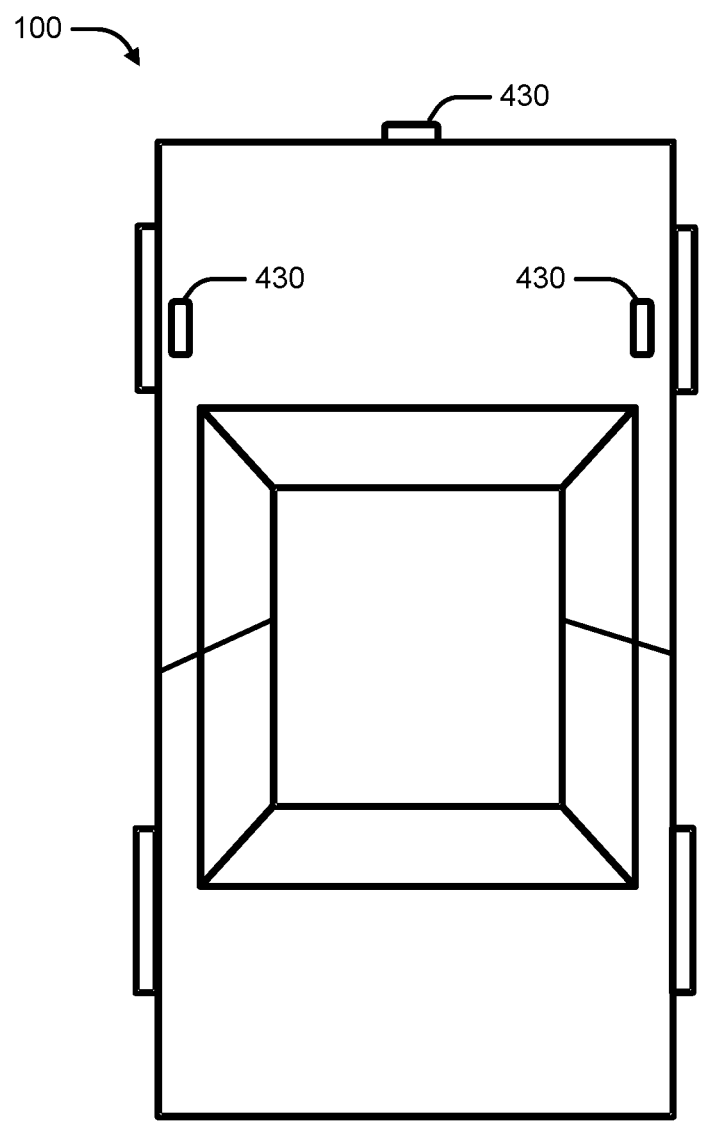
FIGS. 8 and 9 are illustrations of different reader locations on an autonomous road vehicle configured for the transit system.
Figure 9:
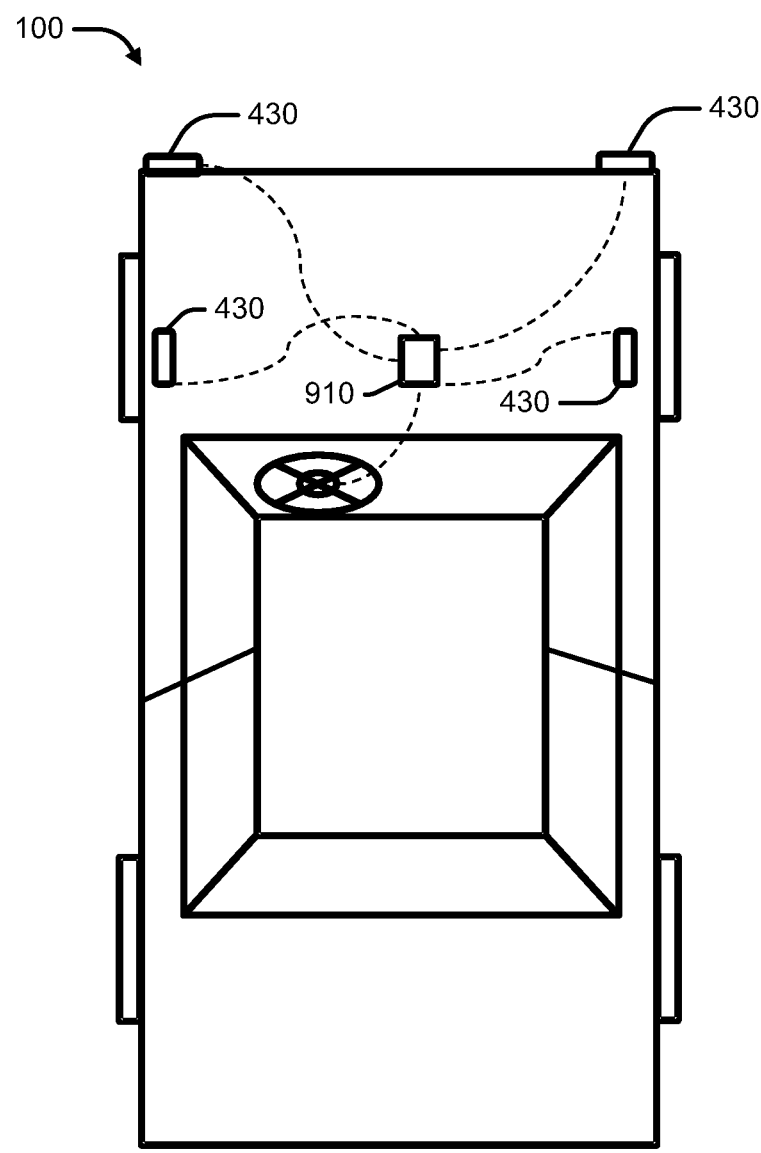

FIGS. 8 and 9 illustrate different reader locations on an autonomous road vehicle 100 configured for the transit system 110. In FIG. 8, an RF reader 430 is mounted to the front center of the autonomous road vehicle 100, and two other RF readers 430 are mounted on the opposite sides of the autonomous road vehicle 100 (e.g., in wheel wells of the autonomous road vehicle 100). In FIG. 9, two RF readers 430 are mounted to the front of the autonomous road vehicle 100, and two other RF readers 430 are mounted on the opposite sides of the autonomous road vehicle 100. These RF reader configurations enable multiple interrogations in a forward direction.

In the autonomous road vehicle 100 of FIG. 9, the RF readers 430 do not process the received wireless signals. Instead, the RF readers 430 are electrically connected to a shared processor 910, which performs the processing. The shared processor 910 may or may not share other vehicle functions such as steering, braking, navigation calculation, GPS positioning, computer vision, etc.

The number and locations of RF readers 430 are not limited to those illustrated in FIGS. 1A, 8 and 9. An autonomous road vehicle 100 may have only a single RF reader 430 located at the front. An autonomous road vehicle 100 may have only RF readers 430 on opposite sides. An autonomous road vehicle 100 may have one or more RF readers 430 mounted at the back of the autonomous road vehicle 100. An autonomous road vehicle 100 may have additional RF readers 430 at strategic locations for better signal reception or for use in triangulation of mobile objects 150.

In other configurations, the RF readers 430 may be placed at other positions from which they can interrogate passive RF devices and receive wireless signals from the RF devices 140 carried by the road objects 130 and the mobile objects 150. For instance, RF readers 430 may be placed on the vehicle roof, and in ports designed into the body of the autonomous road vehicle 100 for the express purpose of mounting the RF readers 430.

The invention claimed is:

1. Apparatus for an autonomous road vehicle, the apparatus comprising:
   a processing system configured to receive wireless RF identification signals from nearby road objects during vehicle navigation and use the wireless identification signals to determine identifications of and relative distances to the nearby road objects;
   computer vision; and
   an autonomous vehicle control system configured to use the computer vision and the relative distances and the identifications to assist the computer vision in identifying and locating the nearby road objects, wherein the identifications and the relative distances determined from the wireless identification signals are used to update computer learning of the computer vision.

2. The apparatus of claim 1, wherein using the wireless identification signals includes using Strength of Signal or Time of Flight of the wireless identification signals to determine the relative distances of the nearby road objects.

3. The apparatus of claim 1, wherein the autonomous vehicle control system is further configured to use the identifications and the relative distances for collision avoidance.

4. Apparatus for an autonomous road vehicle, the apparatus comprising:
   a processing system configured to receive wireless RF identification signals from nearby road objects during vehicle navigation and use the wireless identification signals to determine identifications of and relative distances to the nearby road objects;
computer vision; and
an autonomous vehicle control system configured to use the computer vision and the relative distances and the identifications to assist the computer vision in identifying and locating the nearby road objects, wherein the processing system creates a data structure containing the identifications and the relative locations of the nearby road objects, the vehicle control uses the identifications and the relative distances contained in the data structure of those nearby objects that were not identified or located by the computer vision, the processing system is configured to send the data structure to a mapping service, and the processing system is further configured to receive aggregated data structures from the mapping service and use the aggregated data structures to further enhance situational awareness.

5. The apparatus of claim 4, wherein using the wireless identification signals includes using Strength of Signal or Time of Flight of the wireless identification signals to determine the relative distances of the nearby road objects.

6. The apparatus of claim 4, wherein if a nearby road object is not found in the data structure and cannot be identified or located by the computer vision, then the processing system broadcasts an interrogation signal, receives a responsive wireless identification signal, determines identification and relative distance from the received signal, and adds the identification and the relative distance to the data structure.

7. The apparatus of claim 4, wherein the autonomous vehicle control system is further configured to use the data structures for collision avoidance.

\* \* \* \* \*